(12) United States Patent
Naito et al.

(10) Patent No.: US 11,757,144 B2
(45) Date of Patent: Sep. 12, 2023

(54) POWER SUPPLY DEVICE, ELECTRIC VEHICLE PROVIDED WITH SAID POWER SUPPLY DEVICE, AND ELECTRICITY-STORAGE DEVICE

(71) Applicant: SANYO Electric Co., Ltd., Daito (JP)

(72) Inventors: Masakazu Naito, Hyogo (JP); Naotake Yoshida, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 321 days.

(21) Appl. No.: 17/040,304

(22) PCT Filed: Nov. 16, 2018

(86) PCT No.: PCT/JP2018/042377
§ 371 (c)(1),
(2) Date: Sep. 22, 2020

(87) PCT Pub. No.: WO2019/187313
PCT Pub. Date: Oct. 3, 2019

(65) Prior Publication Data
US 2021/0091428 A1 Mar. 25, 2021

(30) Foreign Application Priority Data
Mar. 30, 2018 (JP) .................................. 2018-069571

(51) Int. Cl.
*H01M 10/658* (2014.01)
*H01M 10/10* (2006.01)
(Continued)

(52) U.S. Cl.
CPC ....... *H01M 10/625* (2015.04); *H01M 10/647* (2015.04); *H01M 10/653* (2015.04);
(Continued)

(58) Field of Classification Search
CPC ............. H01M 10/658; H01M 10/625; H01M 10/647; H01M 10/653; H01M 2220/20;
(Continued)

(56) References Cited

U.S. PATENT DOCUMENTS

| 10,256,507 B1 * | 4/2019 | Busacca ............ H01M 10/0413 |
| 2006/0281008 A1 * | 12/2006 | Mitani .................. H01M 50/44 |
| | | 429/247 |

(Continued)

FOREIGN PATENT DOCUMENTS

| CN | 102585360 A | * | 7/2012 |
| CN | 204088432 U | | 1/2015 |

(Continued)

OTHER PUBLICATIONS

The Extended European Search Report dated Apr. 21, 2021, issued in counterpart EP Application No. 18912953.9. (9 pages).
(Continued)

*Primary Examiner* — Kaity V Chandler
(74) *Attorney, Agent, or Firm* — WHDA, LLP

(57) ABSTRACT

A plurality of battery cells each having a prismatic shape, a fixing member that fixes the plurality of battery cells in a stacked state, and a thermal insulation sheet that is sandwiched between stacking surfaces of battery cells and thermally insulates the adjacent battery cells, wherein thermal insulation sheet is an inorganic fiber sheet in which inorganic fibers are aggregated in a three-dimensionally non-directional manner and fine voids are provided between the inorganic fibers.

8 Claims, 12 Drawing Sheets

(51) Int. Cl.
  *H01M 10/625* (2014.01)
  *H01M 10/647* (2014.01)
  *H01M 10/653* (2014.01)
  *H01M 50/249* (2021.01)
  *H01M 50/209* (2021.01)
  *H01M 50/293* (2021.01)

(52) U.S. Cl.
  CPC ....... *H01M 10/658* (2015.04); *H01M 50/209* (2021.01); *H01M 50/249* (2021.01); *H01M 50/293* (2021.01); *H01M 2220/20* (2013.01)

(58) Field of Classification Search
  CPC ............. H01M 50/209; H01M 10/613; H01M 10/6555; H01M 50/24; Y02E 60/10
  See application file for complete search history.

(56) References Cited

U.S. PATENT DOCUMENTS

| | | |
|---|---|---|
| 2011/0064983 A1 | 3/2011 | Yokoyama et al. |
| 2011/0070476 A1 | 3/2011 | Takahashi et al. |
| 2013/0034764 A1 | 2/2013 | Ochi et al. |
| 2014/0242435 A1 | 8/2014 | Callahan |
| 2018/0261992 A1* | 9/2018 | Bower ................... H01B 3/306 |
| 2018/0290552 A1* | 10/2018 | Chen ........................ B60L 1/00 |
| 2019/0154188 A1 | 5/2019 | Fujii et al. |
| 2019/0165346 A1* | 5/2019 | Wallace ................. B64D 27/00 |

FOREIGN PATENT DOCUMENTS

| | | | |
|---|---|---|---|
| CN | 108475748 A * | 8/2018 | ............ B32B 15/08 |
| EP | 3 269 540 A1 | 1/2018 | |
| JP | 2010-97693 A | 4/2010 | |
| JP | 2013-33668 A | 2/2013 | |
| JP | 2017-168780 A | 9/2017 | |
| WO | 2004/088774 A1 | 10/2004 | |
| WO | 2010/032484 A1 | 3/2010 | |
| WO | 2017/044133 A1 | 3/2017 | |
| WO | 2017/106524 A1 | 6/2017 | |
| WO | 2018/011384 A1 | 1/2018 | |
| WO | 2018/029997 A1 | 2/2018 | |
| WO | 2018/110055 A1 | 6/2018 | |

OTHER PUBLICATIONS

International Search Report dated Jan. 22, 2019, issued in counterpart International Application No. PCT/JP2018/042377. (2 pages).
The EPC Office Action dated Sep. 8, 2022 for the related European Patent Application No. 18912953.9.
The EPC Office Action dated Sep. 12, 2022 for the related European Patent Application No. 18912953.9.

* cited by examiner

POWER SUPPLY DEVICE, ELECTRIC VEHICLE PROVIDED WITH SAID POWER SUPPLY DEVICE, AND ELECTRICITY-STORAGE DEVICE

TECHNICAL FIELD

The present invention relates to a power supply device in which a plurality of battery cells is stacked, and in particular, a power supply device for a motor that is mounted on an electric vehicle such as a hybrid automobile, a fuel cell automobile, an electric automobile, and an electric motorcycle and drives the vehicle, or a power supply device for a large current used for power storage applications or the like for a house or a factory, an electric vehicle including the power supply device, and a power storage device including the power supply device.

BACKGROUND ART

A power supply device that requires a large output has a large number of batteries connected in series or in parallel. For example, in the power supply device or the like used for an automobile such as an electric automobile that runs with a motor or a hybrid automobile that runs on both the motor and an engine, a power storage device that is charged with natural energy, or a backup power source for power failure, a plurality of battery cells is stacked to form a battery block. The battery block insulates and stacks the battery cells. This is because a potential difference occurs in the battery cells connected in series. In order to insulate the battery cells, the battery cells are covered with insulating films, and insulating separators are disposed between the battery cells. (See PTL 1)

In this power supply device, the battery cells are covered with the insulating films to insulate adjacent battery cells, and the insulating separators are disposed between the battery cells to insulate the battery cells. The power supply device having this structure can insulate the battery cells from each other, but has a drawback that the battery cells cannot be effectively thermally insulated. In the power supply device in which a large number of battery cells are stacked, a thermal insulation property, in addition to an insulating property, between the battery cells is extremely important. In particular, in recent years, since capacities of the battery cells have increased and an amount of energy possessed by the battery cells has increased, importance of technology for preventing a chain of thermal runaways is increasing.

CITATION LIST

Patent Literature

PTL 1: Unexamined Japanese Patent Publication No. 2013-33668

SUMMARY OF THE INVENTION

The present invention has been made in order to solve such a conventional problem, and an object thereof is to provide a technique capable of effectively preventing a chain of thermal runaways of battery cells, with a simple structure.

A power supply device according to an aspect of the present invention is a power supply device including a plurality of battery cells each having a prismatic shape, a fixing member that fixes the plurality of battery cells in a stacked state, and a thermal insulation sheet that is sandwiched between stacking surfaces of the battery cells and thermally insulates adjacent battery cells, wherein the thermal insulation sheet is an inorganic fiber sheet where inorganic fibers are aggregated in a three-dimensionally non-directional manner and fine voids are provided between the inorganic fibers.

Furthermore, an electric vehicle including the power supply device including components according to the above aspect includes the power supply device, a running motor that is supplied with electric power from the power supply device, a vehicle body where the power supply device and the running motor are mounted, and wheels that are driven by the motor to run the vehicle body.

Furthermore, a power storage device including the power supply device including components according to the above aspect includes the power supply device, and a power supply controller that controls charging and discharging to the power supply device, and the power supply controller enables the prismatic battery cells to be charged with electric power from an outside and controls charging to the battery cells.

The power supply device of the present invention is characterized by being capable of effectively preventing a chain of thermal runaways of the battery cells with a simple structure. This is because, in the above power supply device, the thermal insulation sheet laminated between the battery cells is the inorganic fiber sheet in which the inorganic fibers are aggregated in a three-dimensionally non-directional manner and the fine voids are provided between the inorganic fibers, so that a thermal insulation property between the battery cells is remarkably improved, and thus thermal energy of a battery cell that generates heat due to the thermal runaway is effectively blocked, and conduction of the thermal energy to adjacent battery cells is blocked. In particular, in the power supply device of the present invention, the inorganic fibers with an extremely excellent heat resistance property are aggregated in a three-dimensionally non-directional manner, and innumerable voids are provided between the inorganic fibers, to achieve, in addition to thermal insulation of the inorganic fibers, a heat resistance property comparable to an air layer as a result of the innumerable voids being provided between fibers. Furthermore, since the inorganic fibers are aggregated three-dimensionally and the fine voids are provided between the fibers to provide an air layer, the above power supply device achieves a characteristic that, even in a state where any of the battery cells thermally runs away and is heated to an abnormally high temperature, for example, higher than 400° C., the voids are maintained by the inorganic fibers having an extremely excellent heat resistance property, and the battery cells are effectively thermally insulated, so that a chain of thermal runaways can be surely prevented. In particular, the inorganic fiber sheet in which the inorganic fiber sheets are aggregated in a three-dimensionally non-directional manner has the small voids between the fibers inside to have a small thermal conductivity, and has excellent compression resistance because the inorganic fibers with an excellent heat resistance property are not softened or melted. Thus, even in a state where any of the battery cells thermally runs away and is heated to a high temperature, and the battery cell expands and presses the thermal insulation sheet, an excellent thermal insulation property is not lost. Therefore, an extremely important property in the power supply device, that is, extremely effectively blocking conduction of the thermal energy of the battery cell thermally running away to adjacent battery cells, thereby effectively blocking induction of the thermal runaway, is achieved.

DESCRIPTION OF EMBODIMENT

Figure 1:
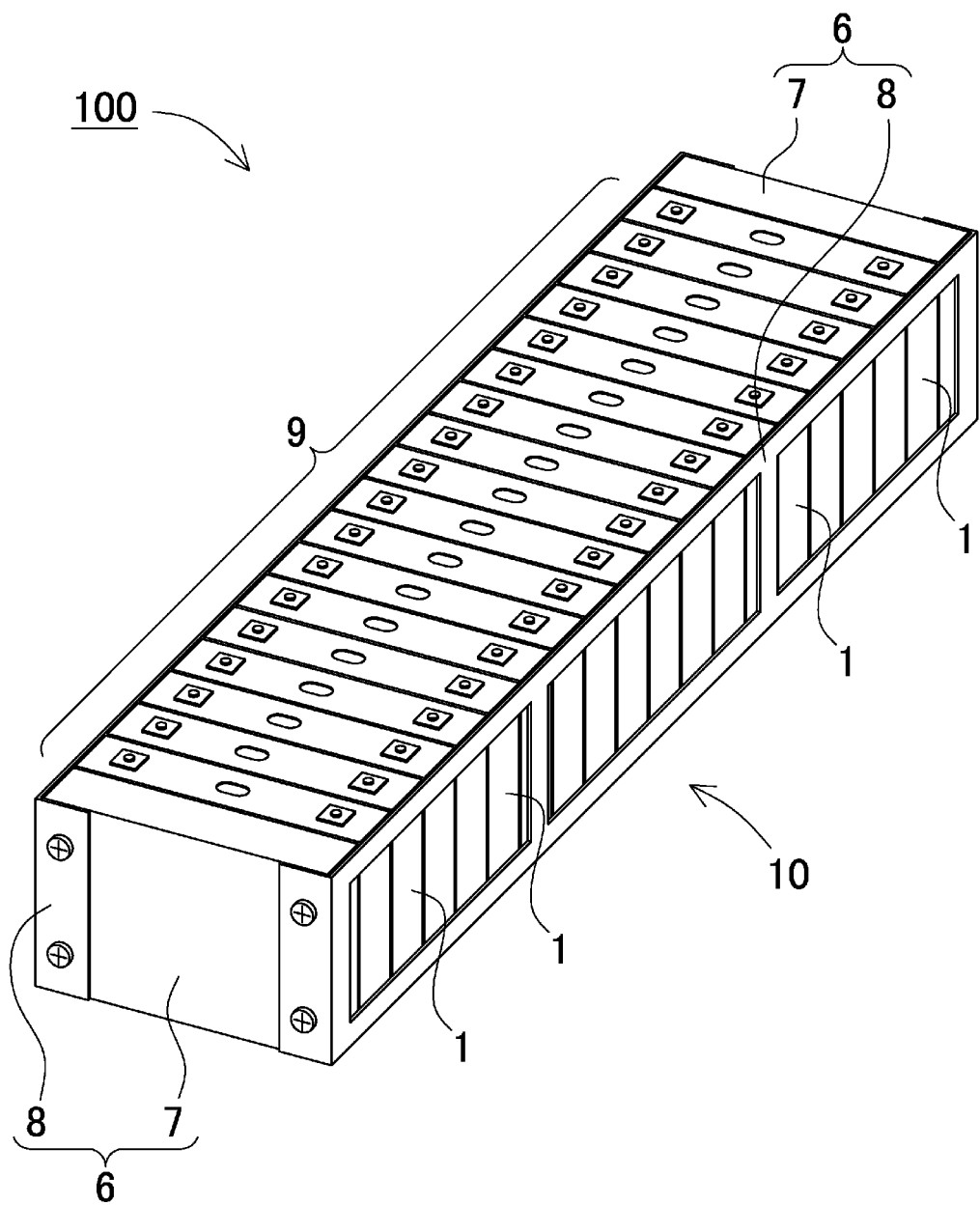
FIG. 1 is a perspective view of a power supply device according to an exemplary embodiment of the present invention.

A power supply device according to an aspect of the present invention may be specified by the following configurations. A power supply device includes a plurality of battery cells 1 each having a prismatic shape, fixing member 6 that fixes the plurality of battery cells 1 in a stacked state, and thermal insulation sheet 2 that is sandwiched between stacking surfaces 11A of battery cells 1 and thermally insulates adjacent battery cells 1, wherein thermal insulation sheet 2 is inorganic fiber sheet 2X where inorganic fibers are aggregated in a three-dimensionally non-directional manner and fine voids are provided between the inorganic fibers.

Thermal insulation sheet 2 may be inorganic fiber sheet 2X including thermoplastic resin in gaps between the inorganic fibers. In the above power supply device, since the inorganic fiber sheet of the thermal insulation sheet includes the thermoplastic resin, when a battery cell thermally runs away and generates heat, a heat generation temperature of a battery is higher than a melting point of the thermoplastic resin and the thermoplastic resin is melted. The melted thermoplastic resin absorbs heat of fusion to improve a substantial heat resistance property of the thermal insulation sheet. Absorption of thermal energy by the heat of fusion further improves cuttability of the inorganic fiber sheet exhibiting an excellent thermal insulation property, and more effectively prevents induction of a thermal runaway.

Thermal insulation sheet 2 may be inorganic fiber sheet 2X where gaps between the inorganic fibers is filled with inorganic particles. Since compression strength is improved by the inorganic particles filling the gaps between the inorganic fibers, the above power supply device is characterized by being capable of maintaining an excellent thermal insulation property to prevent induction of the thermal runaway even in a state where a battery cell thermally runs away and expands. This is because the inorganic particles filling the gaps between the inorganic fibers secure gaps between fibers and prevent fine air from being crushed. This property is especially important for inducing the thermal runaway. This is because the battery cell thermally running away expands and strongly presses the thermal insulation sheet, and thus, when the thermal insulation sheet is crushed in this state, an amount of air in the voids decreases and the thermal insulation property decreases.

The inorganic particles may be inorganic hollow particles or inorganic foamed particles. Since the compression strength is improved by the inorganic hollow particles and the inorganic foamed particles filling the gaps between the inorganic fibers, the above power supply device is characterized by being capable of preventing the thermal insulation property from being decreased as a result of the thermal insulation sheet being pressed by a battery cell expanding due to the thermal runaway. In addition, since the inorganic particles are in hollow or foamed states, air contained in the inorganic particles themselves further improves the thermal insulation property, and thus the above power supply device is characterized by being capable of more effectively preventing the induction of the thermal runaway.

Thermal insulation sheet 2 may be laminated sheet 5 where protective sheet 4 is laminated on a surface of inorganic fiber sheet 2X. In the above power supply device, since the protective sheet is laminated on the surface of the inorganic fiber sheet, the protective sheet can make the surface a smoother layer than a sheet in which the fibers are aggregated, so that the thermal insulation sheet can be surely attached to a surface of a battery cell via the protective sheet to prevent relative displacement with the battery cell. In particular, if the protective sheets are laminated on both surfaces, a characteristic that the inorganic fibers and the inorganic particles can be prevented from falling off is also achieved.

Protective sheet 4 may be thermoplastic resin. In the above power supply device, since the protective sheet of the thermoplastic resin is laminated on the surface of the inorganic fiber sheet, the surface can be made smooth by the protective sheet. In addition, the protective sheet of the thermoplastic resin can be melted by heat generated from a battery cell thermally running away, and the heat of fusion can absorb the thermal energy of the battery cells to improve a substantial heat resistance property. Therefore, the thermal insulation sheet achieves a particularly excellent thermal insulation property to more effectively prevent induction of the thermal runaway of the battery.

Protective sheet 4 may be a plastic sheet, a woven fabric, or a non-woven fabric. Furthermore, protective sheet 4 may be adhered to stacking surface 11A of one of battery cells 1 via double-sided adhesive tape 3. Note that, in this specification, "adhesion" is used in a broad meaning including "pressure-sensitive adhesion".

Hereinafter, an exemplary embodiment of the present invention will be described with reference to the drawings. However, the exemplary embodiment described below is an example for embodying the technical idea of the present invention, and the present invention is not limited to the following. Furthermore, the present specification does not limit members shown in the claims to members in the exemplary embodiment. Especially, sizes, materials, and shapes of components and relative disposition between the components, which are described in the exemplary embodiment, do not limit the scope of the present invention thereto but are simply description examples as long as there is no specific description in particular. Note that the sizes, positional relationships, and the like of members illustrated in the drawings are sometimes exaggerated for clarity of description. Furthermore, in the following description, the same names and reference numerals indicate the same or similar members, and detailed description thereof will be appropriately omitted. Furthermore, regarding each element constituting the present invention, a plurality of elements may be formed of the same member, and one member may serve as the plurality of elements. Conversely, a function of one member may be shared by a plurality of members to be implemented.

Figure 2:
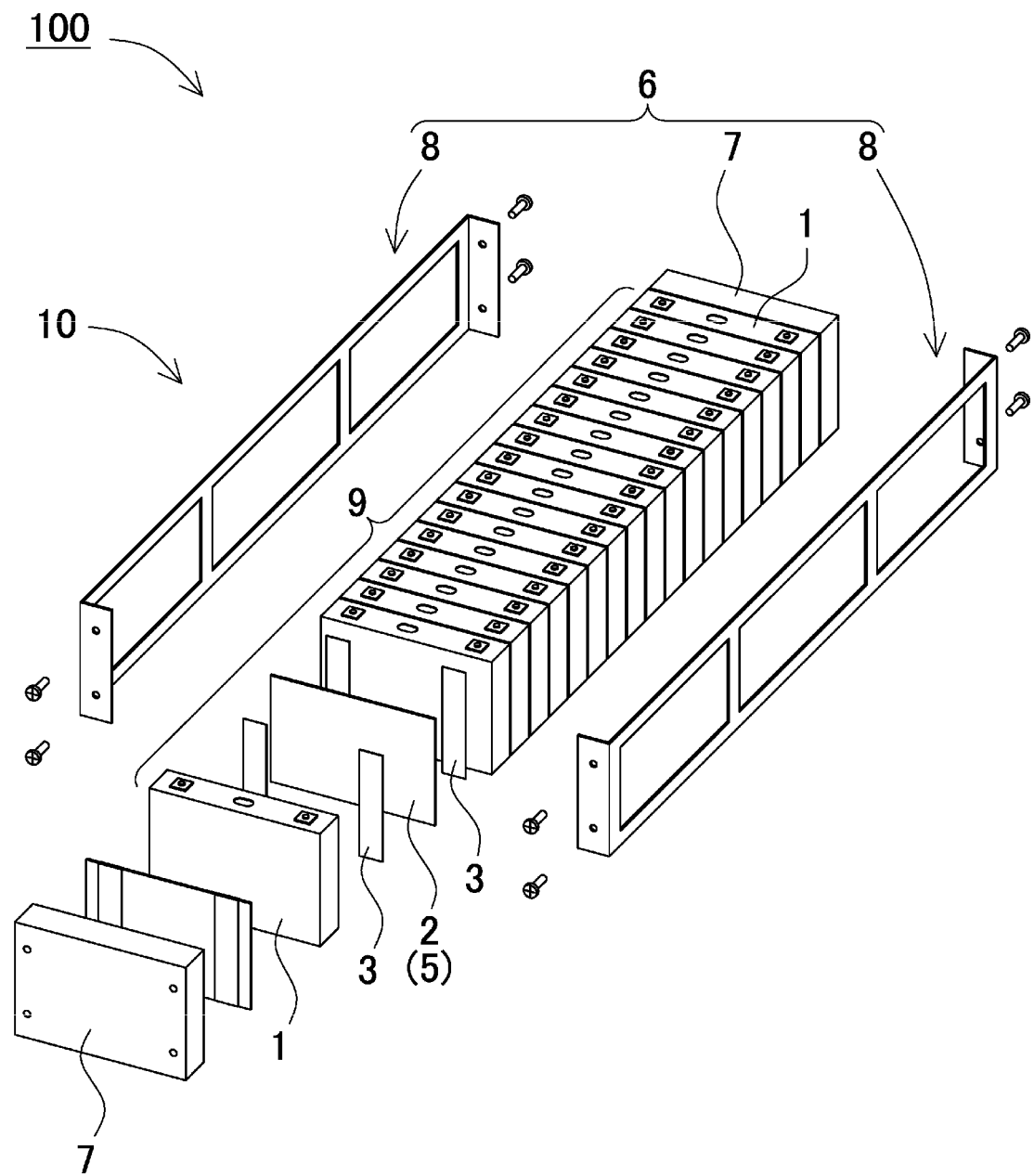
FIG. 2 is an exploded perspective view of the power supply device of FIG. 1.
Figure 3:
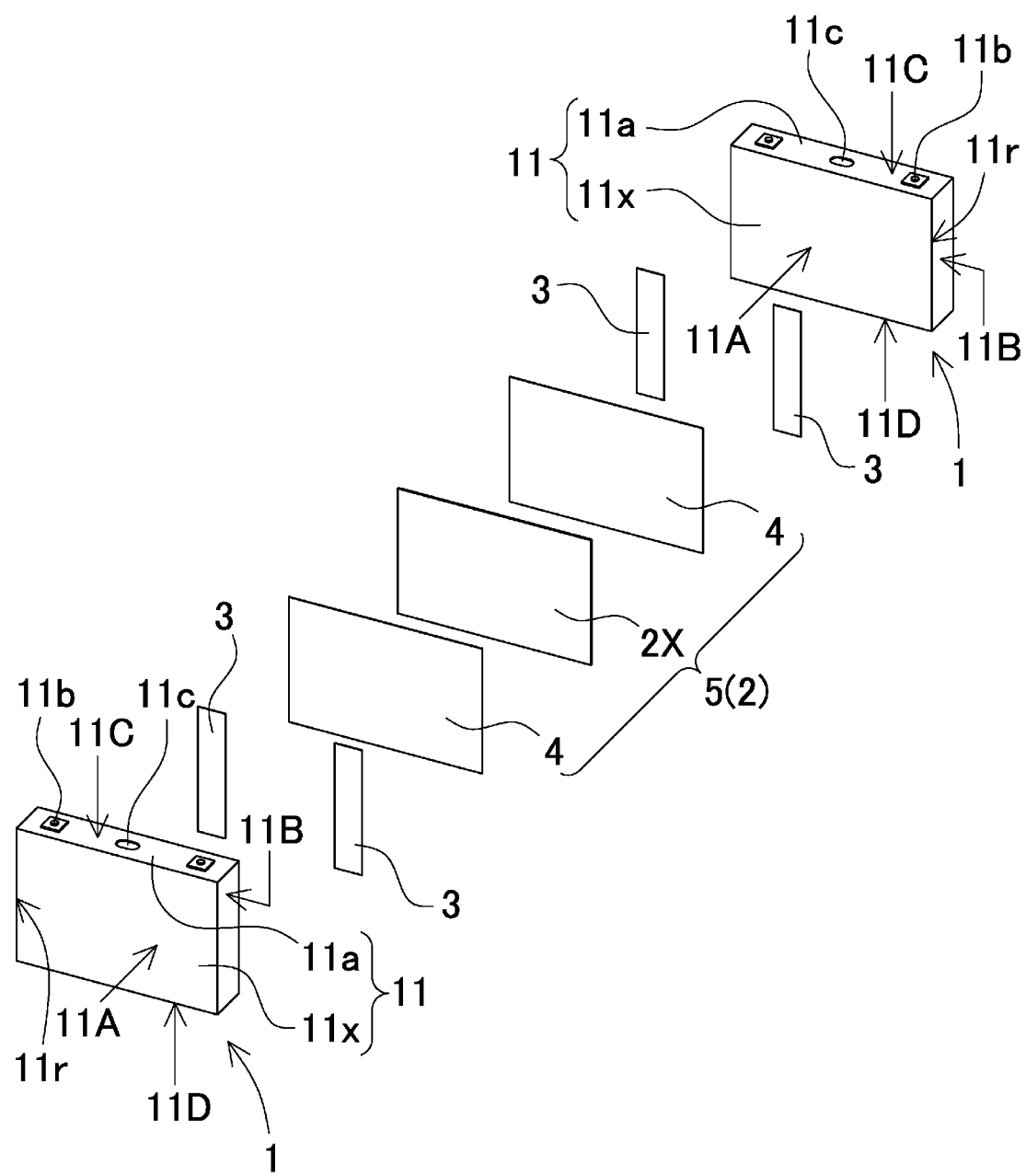
FIG. 3 is an exploded perspective view illustrating a stacked structure of battery cells and a thermal insulation sheet.

A power supply device according to an exemplary embodiment of the present invention is illustrated in FIGS. 1 to 3. In these drawings, FIG. 1 is a perspective view of the power supply device, FIG. 2 is an exploded perspective view of the power supply device in FIG. 1, and FIG. 3 is an exploded perspective view illustrating a stacked structure of battery cells and a thermal insulation sheet. Power supply device 100 is mainly mounted on an electric vehicle such as a hybrid automobile or an electric automobile, and is used as a power source for supplying electric power to a running motor of the vehicle to run the vehicle. However, the power supply device of the present invention can be used for electric vehicles other than the hybrid automobile and the electric automobile, and can also be used for applications requiring a large output other than the electric vehicles, for example, as a power source for a power storage device.

Power supply device 100 illustrated in FIGS. 1 to 3 includes a plurality of prismatic battery cells 1, fixing member 6 that fixes, in a stacked state, battery stack 9 in which the plurality of battery cells 1 is stacked, and thermal insulation sheet 2 that is sandwiched between stacking surfaces 11A of battery cells 1 and thermally insulates adjacent battery cells 1. In power supply device 100 illustrated in the drawings, adjacent battery cells 1 are stacked with thermal insulation sheet 2 therebetween to form battery stack 9, and battery stack 9 is fastened with fixing member 6 to form battery block 10. Power supply device 100 can place battery block 10 on a cooling plate, which is not illustrated, and forcibly cool each of battery cells 1 by the cooling plate.

(Battery Cell 1)

As illustrated in FIG. 3, each of battery cells 1 includes exterior case 11, which forms an outer shape of battery cell 1, having a prismatic (=rectangular) shape that is wider than its thickness, in other words, thinner than its width. In prismatic battery cell 1, exterior case 11 has an opening of bottomed exterior can 11x closed with sealing plate 11a. Here, battery cell 1 including exterior case 11 having a prismatic outer shape includes bottom surface 11D that is a surface of bottomed exterior can 11x on a bottom side, stacking surfaces 11A that are facing surfaces of battery cells 1 stacked on each other and spread in a width direction, side surfaces 11B that are surfaces forming both side surfaces of battery stack 9 and spread in a thickness direction of battery cell 1, and top surface 11C that is a surface formed by sealing plate 11a closing the opening of exterior can 11x. The plurality of prismatic battery cells 1 is stacked in the thickness direction to form battery stack 9.

Note that, in the present specification, a vertical direction of battery cell 1 is a direction illustrated in the drawings, that is, the bottom side of exterior can 11x is downward and a side of sealing plate 11a is upward.

Battery cell 1 is a lithium ion battery. However, battery cell 1 may also be a rechargeable secondary battery such as a nickel metal hydride battery or a nickel cadmium battery. A power supply device that uses a lithium ion secondary battery for battery cell 1 is characterized in that a charging capacity for a volume and mass of the entire battery cell can be increased.

Furthermore, in battery cell 1, positive and negative electrode terminals 11b are provided at both end portions of sealing plate 11a that closes exterior can 11x, and safety valve 11c is provided between the pair of electrode terminals 11b. Safety valve 11c is configured to open when an internal pressure of exterior can 11x rises to a predetermined value or higher so that internal gas can be released. In battery cell 1, a rise of the internal pressure of exterior can 11x can be stopped by safety valve 11c opening.

Here, the exterior can of battery cell 1 is made of metal. Therefore, in order to prevent exterior cans of adjacent battery cells 1 from coming into contact with each other to cause a short circuit, thermal insulation sheet 2 having an insulating property is interposed between stacking surfaces 11A of battery cells 1. As described above, in battery cells 1 that are insulated by thermal insulation sheet 2 having the insulating property to be stacked, the exterior can be made of metal such as aluminum.

(Fixing Member 6)

Battery stack 9 in which the plurality of battery cells 1 is stacked is fastened in a stacking direction via fixing member 6 to form battery block 10. In an example of battery block 10 in FIG. 1, 18 battery cells 1 are stacked. Fixing member 6 includes a pair of end plates 7 that sandwich and hold battery stack 9 from both end surfaces, and bind bars 8 that couple end plates 7. As illustrated in the exploded perspective view of FIG. 2, battery stack 9 is stacked with thermal insulation sheet 2 sandwiched between stacking surfaces 11A of adjacent battery cells 1. However, the fixing member is not necessarily limited to end plates 7 and bind bars 8. As the fixing member, any other structure capable of fastening the battery stack in the stacking direction can be used.

(End Plate 7)

As illustrated in FIG. 2, end plates 7 are disposed at both ends of battery block 10, outside end separators 14. End plates 7 are each a quadrangle having substantially the same shape and size as the outer shape of battery cell 1, and sandwich and hold stacked battery stack 9 from both the end surfaces. Each of end plates 7 is entirely manufactured with metal. Metal end plates 7 can achieve excellent strength and durability. The pair of end plates 7 disposed on both the ends of battery block 10 are fastened via the pair of bind bars 8 disposed on both the side surfaces of battery stack 9, as illustrated in FIGS. 1 and 2.

(Bind Bar 8)

Bind bars 8 are fixed to end plates 7 disposed on both the end surfaces of battery stack 9, and fastens battery stack 9 in the stacking direction via end plates 7. Each of bind bars 8 is a metal plate along a surface of battery stack 9, having a predetermined width and a predetermined thickness. As bind bars 8, metal plates such as iron, preferably steel plates, can be used. As illustrated in FIGS. 1 and 2, bind bars 8 made of the metal plates are disposed along the side surfaces of battery stack 9, and have both ends fixed to the pair of end plates 7 to fasten battery stack 9 in the stacking direction.

(Thermal Insulation Sheet 2)

As illustrated in FIGS. 2 and 3, thermal insulation sheet 2 is sandwiched between stacking surfaces 11A of battery cells 1 and thermally insulates adjacent battery cells 1. Thermal insulation sheet 2 is inorganic fiber sheet 2X in which inorganic fibers are aggregated in a three-dimensionally non-directional manner and fine voids are provided between the inorganic fibers. As the inorganic fibers, fibers made of an inorganic material and having an excellent thermal insulation property are used. As the inorganic fibers, for example, magnesium silicate (sepiolite), rock wool, ceramic fibers, glass fibers, potassium titanate fibers, calcium silicate, and the like are used alone or as a mixture of plural fibers. The magnesium silicate (sepiolite) is composed of the magnesium silicate, similarly to talc, but has a molecular structure different from the talc and has microscopic fine pores, and exhibits an excellent thermal insulation property. In addition, since the magnesium silicate (sepiolite) has innumerable fine fibers on its surface like beaten pulp, the magnesium silicate (sepiolite) can be subjected to wet papermaking to be formed into a sheet shape without use of a binder, and thus is suitable as the inorganic fiber. Furthermore, the rock wool is a non-combustible material that is mainly composed of silicon dioxide and calcium oxide and exhibits excellent thermal insulation and thermal insulation property, and is mass-produced at low cost, and thus raw material cost can be reduced.

Thermal insulation sheet 2 is formed as sheet-shaped inorganic fiber sheet 2X by a wet papermaking method in which the inorganic fibers are aggregated in a three-dimensionally non-directional manner. Thermal insulation sheet 2 is preferably manufactured by thermoplastic resin, inorganic particles and the like being added to the inorganic fibers. As the thermoplastic resin added to inorganic fiber sheet 2X, plastic having a heat resistant temperature of 200° C. or higher can be used, aramid resin having a high heat resistant temperature is suitable, and almost any other thermoplastic resin can also be used. Since a battery cell thermally running away generates heat at a high temperature of 400° C. or higher, most of the thermoplastic resin added to inorganic fiber sheet 2X is melted and thermal insulation sheet 2 is forcibly cooled by heat of fusion. Since the thermoplastic resin added to inorganic fiber sheet 2X is melted in battery cell 1 that thermally runs away and generates heat at an abnormally high temperature, and forcibly cools thermal insulation sheet 2 by the heat of fusion to improve the thermal insulation property of thermal insulation sheet 2, an addition amount of the thermoplastic resin is increased so that a cooling effect by the heat of fusion can be enhanced. However, when the addition amount is large, a porosity of inorganic fiber sheet 2X is decreased and the thermal insulation property by air is decreased. Therefore, the addition amount of the thermoplastic resin is 30% by weight or less, preferably 20% by weight or less, and more preferably about 10% by weight.

As the inorganic particles added to inorganic fiber sheet 2X, particles of an inorganic material such as silica or alumina can be used, and preferably inorganic hollow particles such as shirasu balloon or fine particles obtained by crushing inorganic foam into particles are suitable. Thermal insulation sheet 2 in which porous silica particles such as the shirasu balloon are used as the inorganic hollow particles and the inorganic hollow particles are filled in gaps between the inorganic fibers achieves a particularly excellent thermal insulation property. In thermal insulation sheet 2, shirasu balloon having a particle diameter of several μm to several hundreds of μm is used as the porous silica particles. The shirasu balloon has extremely excellent heat resistance because the shirasu balloon is manufactured by rapidly heating shirasu, which is mainly composed of silica ($SiO_2$), at 1000° C. to be foamed. Furthermore, the shirasu balloon has fine particles having air bubbles and exhibits an excellent thermal insulation property with a thermal conductivity of about 0.06 W/mk to 0.08 W/mk. With these properties, thermal insulation sheet 2 containing the shirasu balloon also maintains an excellent thermal insulation property due to excellent heat resistance of the contained shirasu balloon, even in a state where battery cell 1 is heated to a high temperature. Furthermore, thermal insulation sheet 2 containing the shirasu balloon effectively blocks thermal energy of battery cell 1 that generates heat to a high temperature due to the thermal runaway, to effectively block induction of the thermal runaway of adjacent battery cells 1. Thermal insulation sheet 2 is manufactured by filling the porous silica particles in gaps between porous base materials in which the inorganic fibers are three-dimensionally aggregated. Inorganic fiber sheet 2X can improve the thermal insulation property by adding the inorganic hollow particles or the like, but if an addition amount of the inorganic hollow particles is too large, strength decreases. Thus, the addition amount is, for example, 30% by weight or less, preferably 20% by weight or less, and more preferably about 10% by weight or less.

The thermoplastic resin and the inorganic particles are added to papermaking slurry in a process of manufacturing inorganic fiber sheet 2X by the wet papermaking method. The thermoplastic resin is added to the papermaking slurry in a state of fibers. The thermoplastic resin added to the papermaking slurry in the state of fibers is subjected to the wet papermaking to be processed into a sheet shape, and then heated and pressed to be melted, so that the inorganic fibers can be bonded at intersections.

Inorganic fiber sheet 2X is manufactured by the wet papermaking method, aggregates the inorganic fibers in a three-dimensionally non-directional manner, fills the gaps of the fibers with additives such as the inorganic particles, and is processed into a sheet shape. The papermaking slurry has the inorganic fibers, the additives, and the like uniformly dispersed in a liquid, and then passes through a process such as screening (removal of foreign matters, lumps, and the like) to adjust a final concentration to 0.01% to 0.5% by mass. The papermaking slurry in which the additives are suspended in the inorganic fibers is subjected to the wet papermaking to be processed into a sheet shape, dried, and then hot-pressed to obtain inorganic fiber sheet 2X having a predetermined thickness.

Inorganic fiber sheet 2X manufactured in a sheet shape by hot-pressing after the wet papermaking is preferably used in a state where protective sheet 4 is laminated on a surface of inorganic fiber sheet 2X. As protective sheet 4, a plastic sheet made of the thermoplastic resin, a woven fabric, or a non-woven fabric is used, and the plastic sheet is preferably used. Protective sheet 4 is adhered to the surface of inorganic fiber sheet 2X via an adhesive. However, in inorganic fiber sheet 2X manufactured by the wet papermaking with addition of the thermoplastic resin, it is also possible to laminate the plastic sheet made of the thermoplastic resin, the woven fabric, or the non-woven fabric on the surface of inorganic fiber sheet 2X, and heat and press protective sheet 4 and inorganic fiber sheet 2X from both sides to heat-weld protective sheet 4 to inorganic fiber sheet 2X.

Thermal insulation sheet 2 having protective sheet 4 bonded to a surface thereof can reinforce the surface of inorganic fiber sheet 2X with protective sheet 4. Therefore, it is possible to manufacture inorganic fiber sheet 2X by the wet papermaking without addition of the thermoplastic resin that binds the inorganic fibers, and to adhere protective sheet 4 to the surface of inorganic fiber sheet 2X to form thermal insulation sheet 2 having sufficient strength. Furthermore, inorganic fiber sheet 2X in which the inorganic particles, granular thermoplastic resin, and the like is added in the gaps between the inorganic fibers is manufactured without use of a binder or with a small amount of the binder used, and protective sheet 4 is adhered to the surface of inorganic fiber sheet 2X, so that additives such as the inorganic particles can be prevented from leaking to an outside. However, if inorganic fiber sheet 2X is manufactured by bonding the intersections of the inorganic fibers with the thermoplastic resin, and protective sheet 4 is adhered to the surface of inorganic fiber sheet 2X, it is possible to obtain tougher thermal insulation sheet 2.

Thermal insulation sheet 2 illustrated in FIG. 3 is laminated sheet 5 in which protective sheets 4 are laminated on and adhered to both surfaces of inorganic fiber sheet 2X. Each of protective sheets 4 is the plastic sheet of the thermoplastic resin, the woven fabric, or the non-woven fabric. Thermal insulation sheet 2 can prevent leakage of the inorganic hollow particles by protective sheets 4 adhered to both the surfaces. In addition, protective sheets 4 are adhered to stacking surfaces 11A of battery cells 1 with double-sided adhesive tape 3 or the like, so that thermal insulation sheet 2 can be closely adhered to battery cells 1. Protective sheets 4 can be adhered to stacking surfaces 11A of battery cells 1 via an adhesive or a pressure-sensitive adhesive instead of double-sided adhesive tape 3.

Battery block 10 in which protective sheets 4 are adhered to both the surfaces of inorganic fiber sheet 2X, and protective sheets 4 are adhered to stacking surfaces 11A of adjacent battery cells 1 can inhibit relative displacement of battery cells 1 adjacent to each other via thermal insulation sheet 2, that is, displacement of battery cells 1, to improve rigidity of battery block 10. In particular, since inorganic fiber sheet 2X in which the intersections of the inorganic fibers are not bonded with the thermoplastic resin cannot be made to have sufficient strength and is a material with large brittleness, it is difficult to control the displacement of battery cells 1, but adhering protective sheets 4 on both the surfaces of inorganic fiber sheet 2X can prevent this adverse effect.

Thermal insulation sheet 2 having low rigidity and low shape retention to retain flatness has a problem that, when sandwiched between battery cells 1 to be used, there is a risk of displacement or wrinkling, which significantly reduces workability. However, in thermal insulation sheet 2, protective sheet 4 laminated on and adhered to the surface of inorganic fiber sheet 2X is formed as a shape-retaining sheet having shape retention with higher rigidity than inorganic fiber sheet 2X, so that the problem can be solved. The thermal insulation sheet with the shape-retaining sheet adhered to the surface of the inorganic fiber sheet enhances the shape retention, and the shape-retaining sheet is attached to a stacking surface of a battery cell to assemble the battery cells, so that the rigidity of the battery block can be enhanced. In addition, attaching the thermal insulation sheet to the battery cells and then assembling the battery cells makes it possible to prevent the thermal insulation sheet from being displaced or wrinkled with respect to the battery cells when the plurality of battery cells is assembled into the battery block. Furthermore, in thermal insulation sheet 2, laminating the shape-retaining sheet having shape retention with higher rigidity than the inorganic fiber sheet to form the laminated sheet makes it possible to enhance the rigidity without impairing thermal insulating performance of the thermal insulation sheet, and thus can further improve the workability.

As the shape-retaining sheet, for example, a plastic sheet of the thermoplastic resin is used. Since the shape retention of the plastic sheet can be adjusted by its thickness, for example, a hard plastic sheet having a thickness of 0.1 mm is used as the shape-retaining sheet. Thermal insulation sheet 2 has the shape-retaining sheets adhered to both the surfaces of inorganic fiber sheet 2X to improve the shape retention. However, the shape-retaining sheet may be adhered only to one side surface of inorganic fiber sheet 2X.

In addition, the shape-retaining sheet does not necessarily have to have shape retention with higher rigidity than the inorganic fiber sheet. The shape-retaining sheet in the above-described exemplary embodiment also has a role of flattening the surface of inorganic fiber sheet 2X. The inorganic fiber sheet alone is difficult to adsorb when a suction type automatic machine is used, but improving surface smoothness with the shape-retaining sheet makes it possible to use the suction type automatic machine. Furthermore, providing the shape-retaining sheet makes it possible to prevent paper dust of inorganic fiber sheet 2X from falling off, so that it is possible to reduce a frequency of cleaning the automatic machine. These effects can be achieved by a configuration in which the shape-retaining sheet is adhered only to one side surface of inorganic fiber sheet 2X.

Furthermore, the surface of thermal insulation sheet 2 is subjected to a water repellent treatment to reduce hygroscopicity, so that it is possible to prevent an adverse effect such as an electric leak caused by condensed water adhering to the surface. In addition, thermal insulation sheet 2 is provided with folding grooves along ridgelines 11r of exterior case 11 of battery cell 1 so that thermal insulation sheet 2 can be bent along ridgelines 11r of battery cell 1 and surely closely adhered to battery cell 1. Furthermore, thermal insulation sheet 2 is also characterized by being capable of further improving the thermal insulation property by laminating and thickening a plurality of inorganic fiber sheets 2X. The plurality of inorganic fiber sheets 2X can be adhered via an adhesive or a pressure-sensitive adhesive, or adhered by partially melting fibers of the porous base material.

Figure 4:
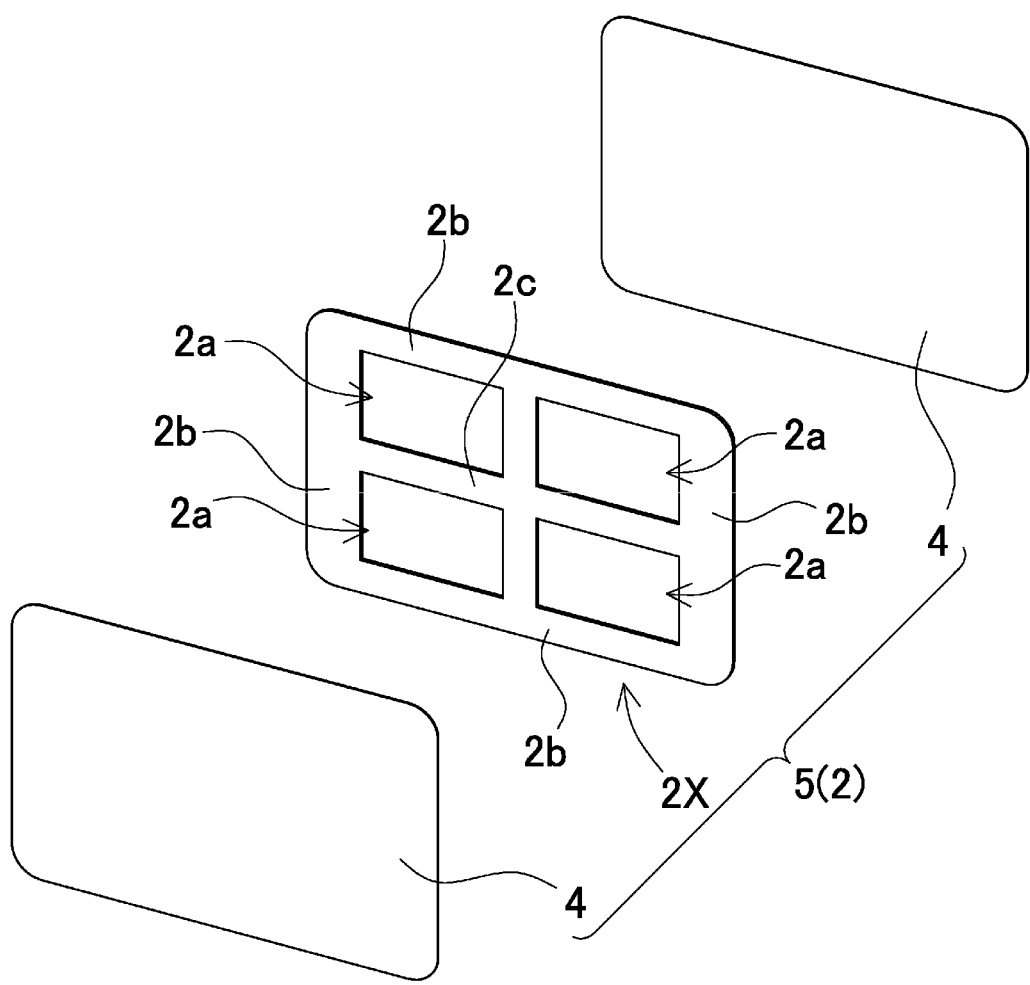
FIG. 4 is an exploded perspective view illustrating another example of the thermal insulation sheet.
Figure 5:
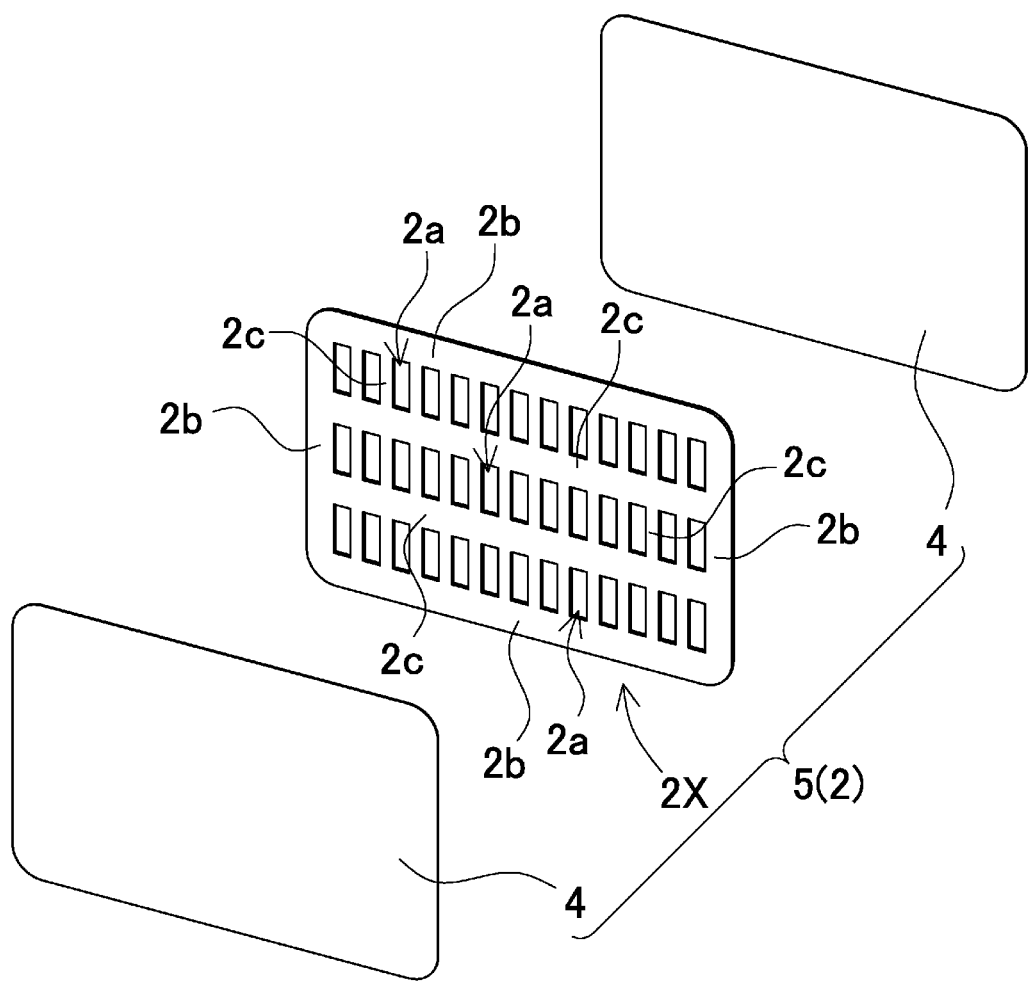
FIG. 5 is an exploded perspective view illustrating another example of the thermal insulation sheet.

Furthermore, thermal insulation sheet 2 may have a structure illustrated in FIGS. 4 and 5. In thermal insulation sheet 2 illustrated in these drawings, inorganic fiber sheet 2X is provided with openings 2a. Inorganic fiber sheet 2X illustrated in FIG. 4 is provided with openings 2a in four regions that are partitioned vertically and horizontally in a front view. Inorganic fiber sheet 2X is provided with four openings 2a while quadrangular outer peripheral edge portion 2b and coupling portion 2c vertically and horizontally extending in a central portion maintain the entire sheet in a form of sheet shape. Inorganic fiber sheet 2X illustrated in FIG. 5 is provided with a large number of openings 2a throughout. Inorganic fiber sheet 2X is provided with a large number of openings 2a in a state where openings 2a are evenly distributed vertically and horizontally, while quadrangular outer peripheral edge portion 2b and a plurality of rows of coupling portions 2c vertically and horizontally extending in a grid pattern in a central portion maintain the entire sheet in a form of sheet shape. However, in thermal insulation sheet 2, a number, shapes, sizes, a disposition, and the like of openings 2a provided on inorganic fiber sheet 2X are not limited to the above, and can be variously changed.

Thermal insulation sheet 2 in FIG. 4 and FIG. 5 has protective sheets 4 laminated on both the surfaces of inorganic fiber sheet 2X having openings 2a to form laminated sheet 5, and thus forms air layers by openings 2a inside. As described above, thermal insulation sheet 2 having openings 2a on inorganic fiber sheet 2X is characterized by being capable of forming the air layers by openings 2a between stacked battery cells 1, and exhibiting the thermal insulation property by the air layers. Furthermore, by being provided with openings 2a on inorganic fiber sheet 2X, thermal insulation sheet 2 is characterized by being capable of reducing a weight while reducing a manufacturing cost. In particular, since the thermal insulation sheets are laminated between a large number of battery cells 1 which are stacked on each other, a number of thermal insulation sheets used also increases in a power supply device in which a large number of battery cells 1 are stacked. Therefore, providing openings 2a on each inorganic fiber sheet 2X makes it possible to effectively reduce the manufacturing cost and the weight of the power supply device as a whole.

Figure 6:
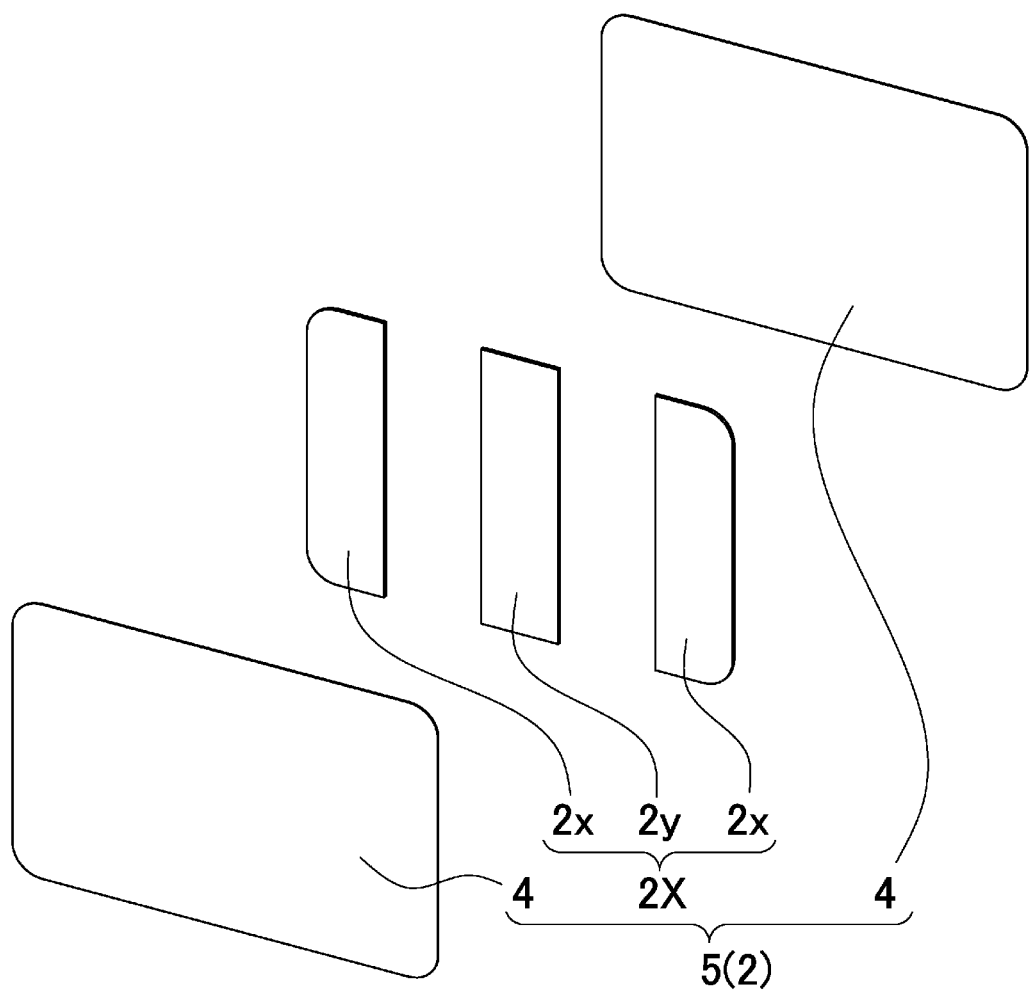
FIG. 6 is an exploded perspective view illustrating another example of the thermal insulation sheet.

Furthermore, in thermal insulation sheet 2 illustrated in FIG. 6, inorganic fiber sheet 2X is divided into a plurality of divided sheets 2x, 2y. Inorganic fiber sheet 2X illustrated in the drawing is cut in a vertical direction in the drawing and divided into three divided sheets 2x, 2y consisting of divided sheets 2x on both side portions and divided sheet 2y at a central portion. In thermal insulation sheet 2 in the drawing, protective sheets 4 are laminated on both surfaces of divided sheets 2x, 2y in a posture in which divided sheets 2x on both sides face both side portions of stacking surface 11A of battery cell 1 and divided sheet 2y at the central portion face a horizontal center of battery cell 1, in a state where divided sheets 2x, 2y are apart from each other, to form laminated sheet 5. In thermal insulation sheet 2, disposing the plurality of divided sheets 2x, 2y apart from each other forms air layers between adjacent divided sheets 2x, 2y, and the air layers can thermally insulate battery cells 1. Furthermore, thermal insulation sheet 2 is characterized by being capable of reducing the manufacturing cost and the weight of the entire power supply device by reducing inorganic fiber sheets 2X used. Furthermore, since the air layers formed between divided sheets 2x, 2y forms ventilation gaps penetrating vertically between stacked battery cells 1, thermal insulation sheet 2 is also characterized in that the ventilation gaps can allow air to pass through in the vertical direction between battery cells 1 to cool battery cells 1 by natural convection.

Above-described thermal insulation sheet 2 having a structure described below is sandwiched between stacking surfaces 11A of stacked battery cells 1, and thermally insulates adjacent battery cells 1. Thermal insulation sheet 2 illustrated in FIGS. 3 to 6 is plate-shaped laminated sheet 5 in which protective sheets 4 are laminated on both the surfaces of inorganic fiber sheet 2X. An entire outer shape of thermal insulation sheet 2 is quadrangular shape that is substantially equal to or slightly smaller than an outer shape of stacking surface 11A of quadrangular battery cell 1. Thermal insulation sheet 2 having this shape is sandwiched between adjacent battery cells 1 to thermally insulate adjacent battery cells 1 from each other.

Thermal insulation sheet 2 disposed between adjacent battery cells 1 is disposed at fixed positions on stacking surface 11A of battery cell 1 via double-sided adhesive tape 3. Thermal insulation sheet 2 illustrated in FIG. 3 is adhered to stacking surface 11A of battery cell 1 via two rows of double-sided adhesive tapes 3. In FIG. 3, two rows of double-sided adhesive tapes 3 are disposed apart from each other in a lateral width direction of stacking surface 11A of battery cell 1. However, two rows of double-sided adhesive tapes 3 can be disposed apart in a vertical direction of stacking surface 11A. As described above, in a structure in which thermal insulation sheet 2 is adhered via two rows of double-sided adhesive tapes 3, thermal insulation sheet 2 is adhered in a state of being taut, so that thermal insulation sheet 2 can be disposed on stacking surface 11A of battery cell 1 in a closely adhered state while thermal insulation sheet 2 is prevented from wrinkling. Furthermore, thermal insulation sheet 2 may be adhered to stacking surface 11A of battery cell 1 via three rows or more of double-sided adhesive tapes 3. However, thermal insulation sheet 2 may be adhered via an adhesive or a pressure-sensitive adhesive instead of double-sided adhesive tape 3.

Figure 7:
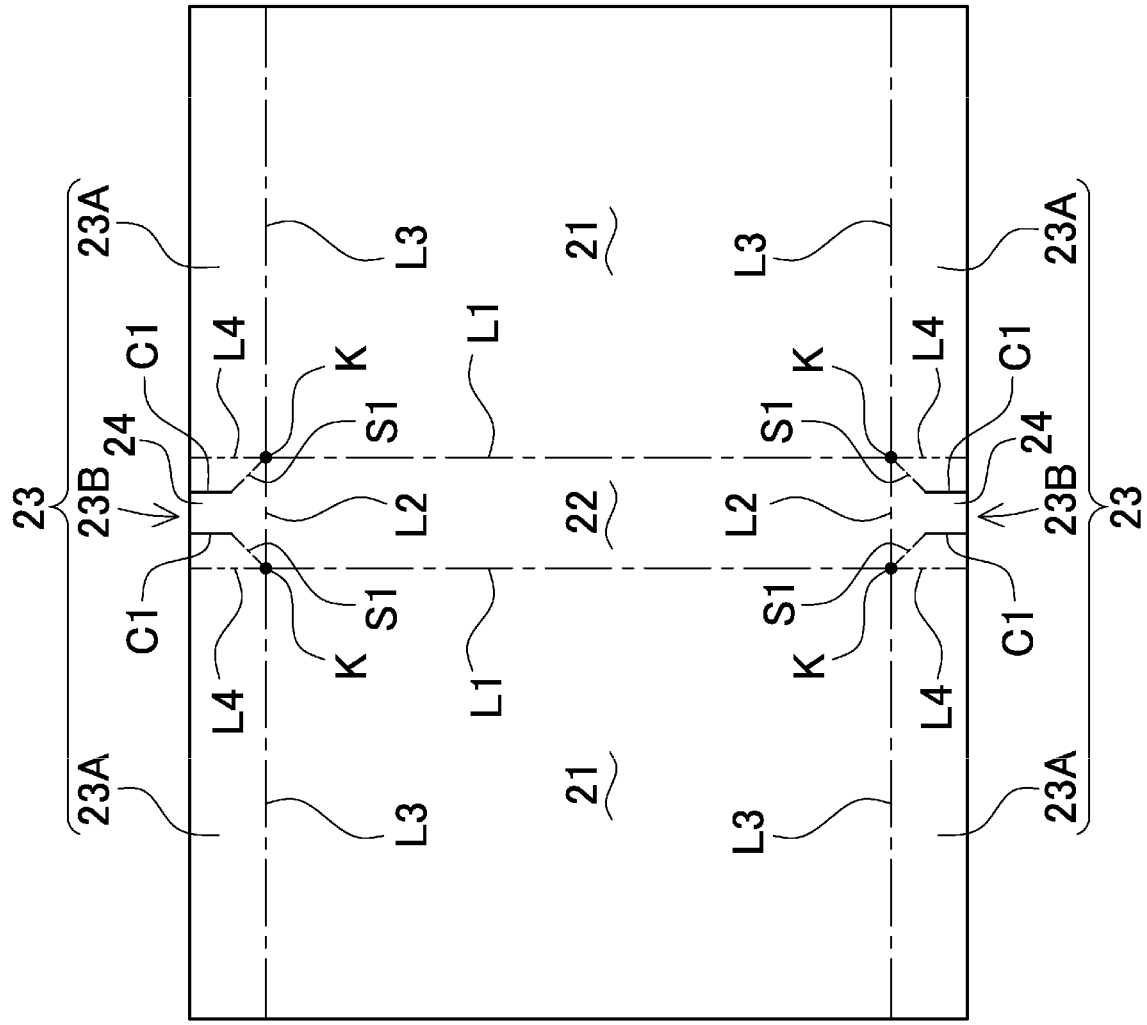
FIG. 7 is a development view illustrating another example of thermal insulation sheet.
Figure 8:
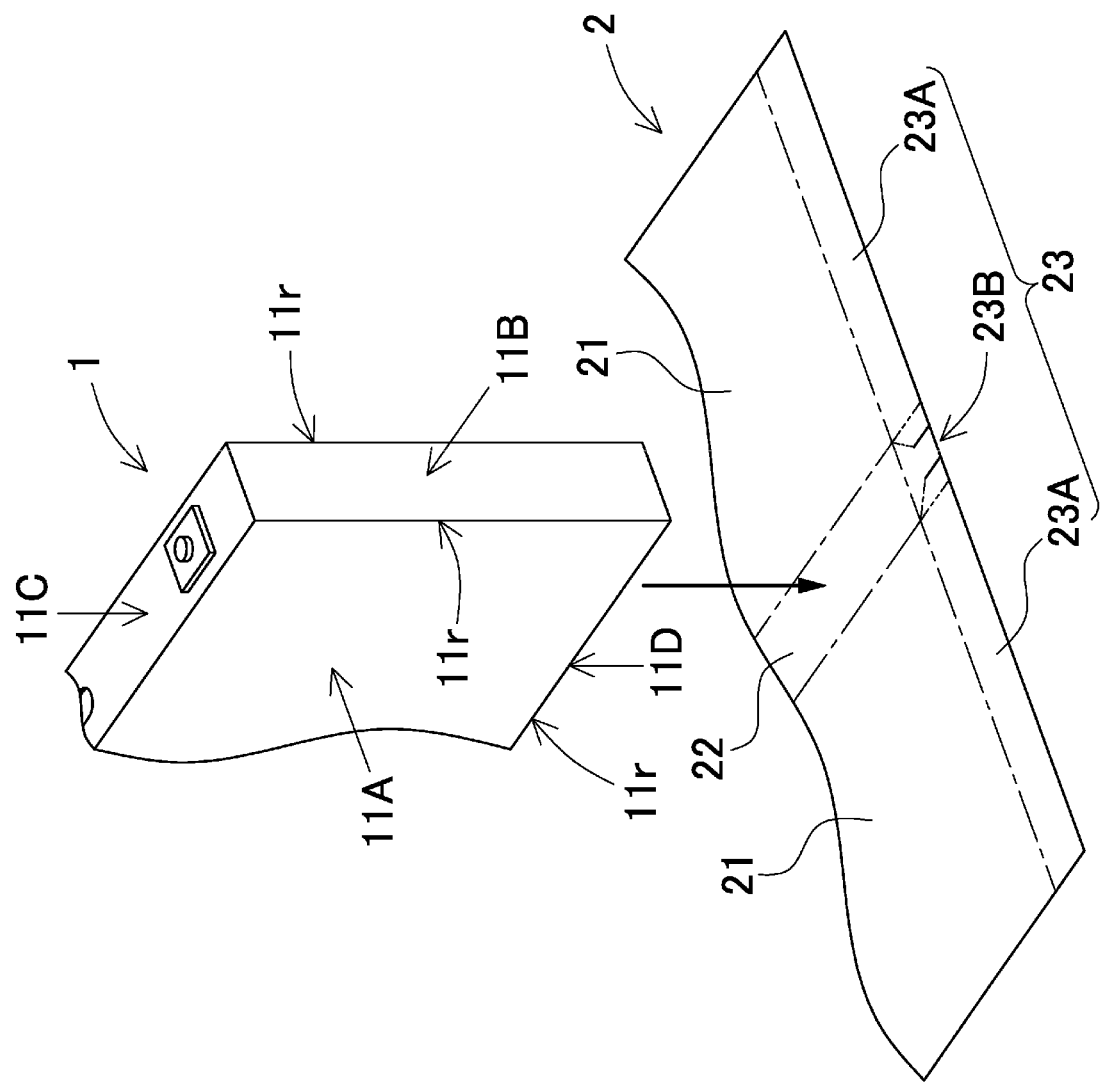
FIG. 8 is a perspective view illustrating a process of covering a battery cell with the thermal insulation sheet illustrated in FIG. 7.
Figure 9:
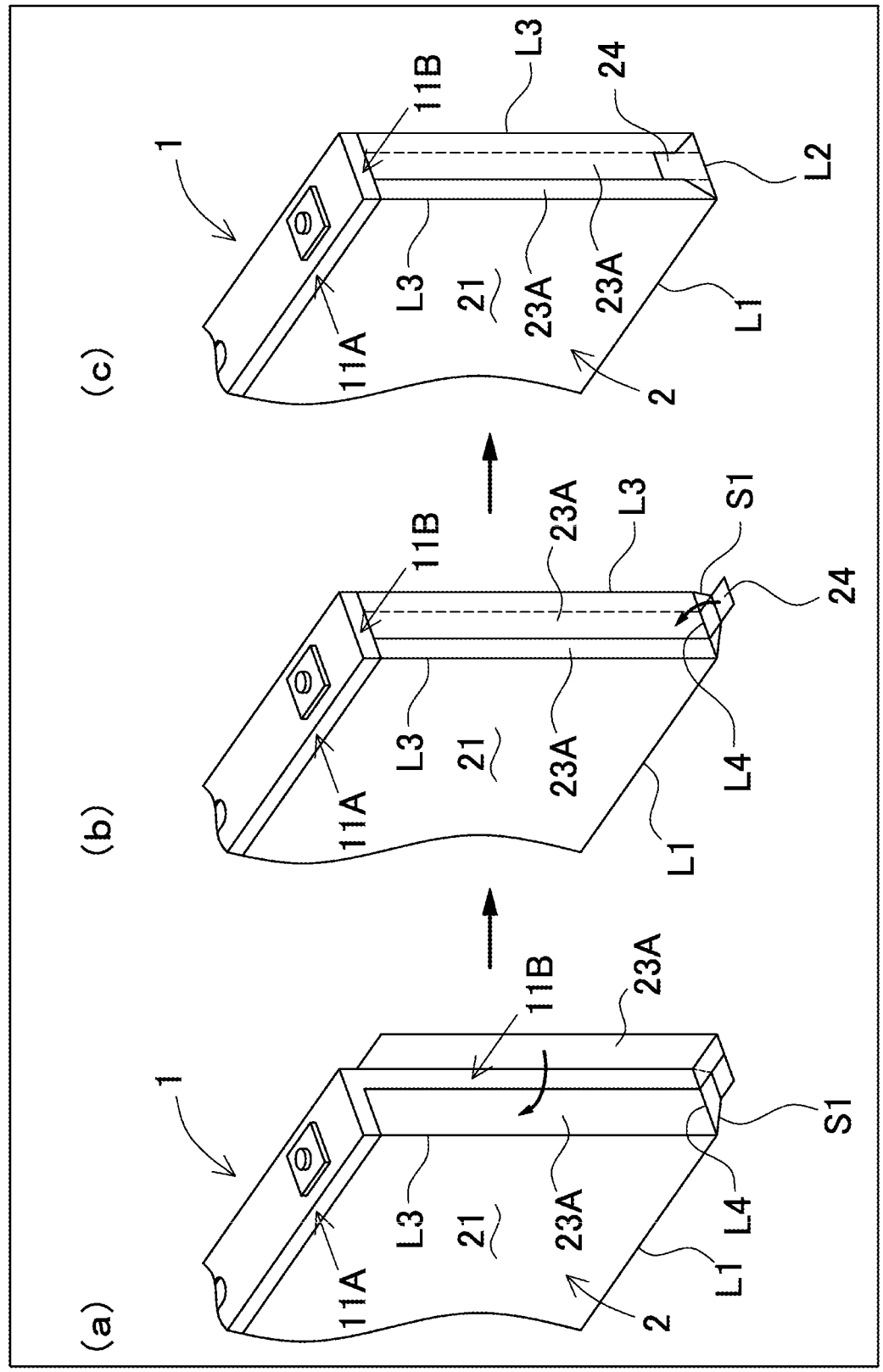
FIG. 9 is a perspective view illustrating a process of covering the battery cell with the thermal insulation sheet illustrated in FIG. 7.

Furthermore, FIGS. 7 to 9 illustrate an example of thermal insulation sheet 2 that covers an outer peripheral surface of exterior case 11 of battery cell 1. Thermal insulation sheet 2 covers and thermally insulates a surface of exterior case 11 of battery cell 1 excluding top surface 11C. Thermal insulation sheet 2 preferably covers entire stacking surfaces 11A, side surfaces 11B, and bottom surface 11D. However, thermal insulation sheet 2 may have a structure in which entire bottom surface 11D and entire stacking surfaces 11A are covered, or entire stacking surfaces 11A and entire side surfaces 11B are covered.

Thermal insulation sheet 2 illustrated in a development view of FIG. 7 is bent along ridgelines 11r of exterior case 11 of battery cell 1 to cover exterior case 11. In FIG. 7, boundary lines L1, L2, L3 and folding lines S1 that are folding lines to be folded inward are shown by one-dot chain lines, and boundary lines L4 that are folding lines to be folded outward are shown by two-dot chain lines, and cutting lines C1 to be cut are shown by solid lines. The folding lines that are folded inward or outward are provided with folding grooves to facilitate folding. Folded portions that are folded along ridgelines 11r of exterior case 11 are provided with folding grooves, which are not illustrated, to form triangular shapes in a cross-sectional view, so that thermal insulation sheet 2 can be folded at a right angle at folds to cover exterior case 11 with good appearance. Thermal insulation sheet 2 folded along exterior case 11 of battery cell 1 is formed into a bag shape by adhering a wrap portion to cover the surface of exterior case 11.

Thermal insulation sheet 2 illustrated in the development view of FIG. 7 has a rectangular outer shape as a whole, and is partitioned into a plurality of regions by the plurality of intersecting boundary lines L1, L2, L3. Thermal insulation sheet 2 illustrated in FIG. 7 is partitioned into stacking surface covering portions 21 covering stacking surfaces 11A of exterior can 11x, bottom surface covering portion 22 covering bottom surface 11D of exterior can 11x, and side surface covering portions 23 covering side surfaces 11B of exterior can 11x. Thermal insulation sheet 2 has a shape in which bottom surface covering portion 22 is provided between the pair of stacking surface covering portions 21, and side surface covering portions 23 protrude from both sides of stacking surface covering portions 21 and bottom surface covering portion 22, which are continuous. Side surface covering portions 23 includes first side surface covering portions 23A that are provided on both sides of stacking surface covering portions 21 and protrude outward from side edges of stacking surface covering portions 21, and second side surface covering portions 23B that are provided on both sides of bottom surface covering portion 22 and protrude outward from side edges of bottom surface covering portion 22.

As illustrated in the development view of FIG. 7, first side surface covering portions 23A and second side surface covering portions 23B are continuous without being separated at boundaries. Thermal insulation sheet 2 in the drawing is provided with folding lines S1 extending diagonally from intersections K of boundary lines L4 between first side surface covering portions 23A and second side surface covering portions 23B and boundary lines L2 between bottom surface covering portion 22 and second side surface covering portions 23B, on second side surface covering portions 23B. In addition, thermal insulation sheet 2 in the drawing is provided with cutting lines C1 from middle portions of folding lines S1 toward outsides to form slits. In thermal insulation sheet 2 illustrated in the drawing, angles formed by folding lines S1 extending from intersections K are about 45 degrees.

In thermal insulation sheet 2 in FIG. 7, as illustrated in FIG. 8, bottom surface 11D of battery cell 1 is placed on bottom surface covering portion 22, and as illustrated in FIG. 9, boundary lines L1 between bottom surface covering portion 22 and stacking surface covering portions 21 are folded inward, so that bottom surface covering portion 22 covers bottom surface 11D of exterior can 11x, and stacking surface covering portions 21 cover stacking surfaces 11A of exterior can 11x. Furthermore, boundary lines L3 between first side surface covering portions 23A and stacking surface covering portions 21 are folded inward, boundary lines L4 between first side surface covering portions 23A and second side surface covering portion 23B are folded outward, folding lines S1 are folded inward on second side surface covering portion 23B, and one first side surface covering portion 23A is folded onto side surface 11B of exterior can 11x. Similarly, first side surface covering portion 23A adjacent to one first side surface covering portion 23A is folded onto side surface 11B of exterior can 11x, and adjacent first side surface covering portions 23A are wrapped and adhered to side surface 11B of exterior can 11x. Furthermore, boundary line L2 between second side surface covering portion 23B and bottom surface covering portion 22 is folded inward, and coupling portion 24 formed by folding second side surface covering portion 23B is adhered to wrapped first side surface covering portions 23A in a laminated state, so that first side surface covering portions 23A and second side surface covering portion 23B cover entire side surface 11B of exterior can 11x.

As described above, the outer peripheral surface of exterior case 11 excluding top surface 11C is covered with stacking surface covering portions 21, bottom surface covering portion 22, and side surface covering portions 23 of thermal insulation sheet 2. Stacking surface covering portions 21, bottom surface covering portion 22, and side surface covering portions 23 are adhered to the surface of the exterior case of the battery cell via a double-sided adhesive tape or an adhesive or a pressure-sensitive adhesive. In thermal insulation sheet 2, all of stacking surface covering portions 21, bottom surface covering portion 22, and side surface covering portions 23 can be adhered to exterior case 11 of battery cell 1, but may be partially adhered within a range in which thermal insulation sheet 2 covering exterior case 11 does not come off.

The above power supply device is optimal for a power supply device for a vehicle that supplies electric power to a motor that runs an electric vehicle. As the electric vehicle on which the power supply device is mounted, an electric vehicle such as a hybrid automobile or a plug-in hybrid automobile that runs with both an engine and the motor or an electric automobile that runs only with the motor can be used, and the power supply device is used as a power source for these electric vehicles.

(Power Supply Device for Hybrid Vehicle)

Figure 10:
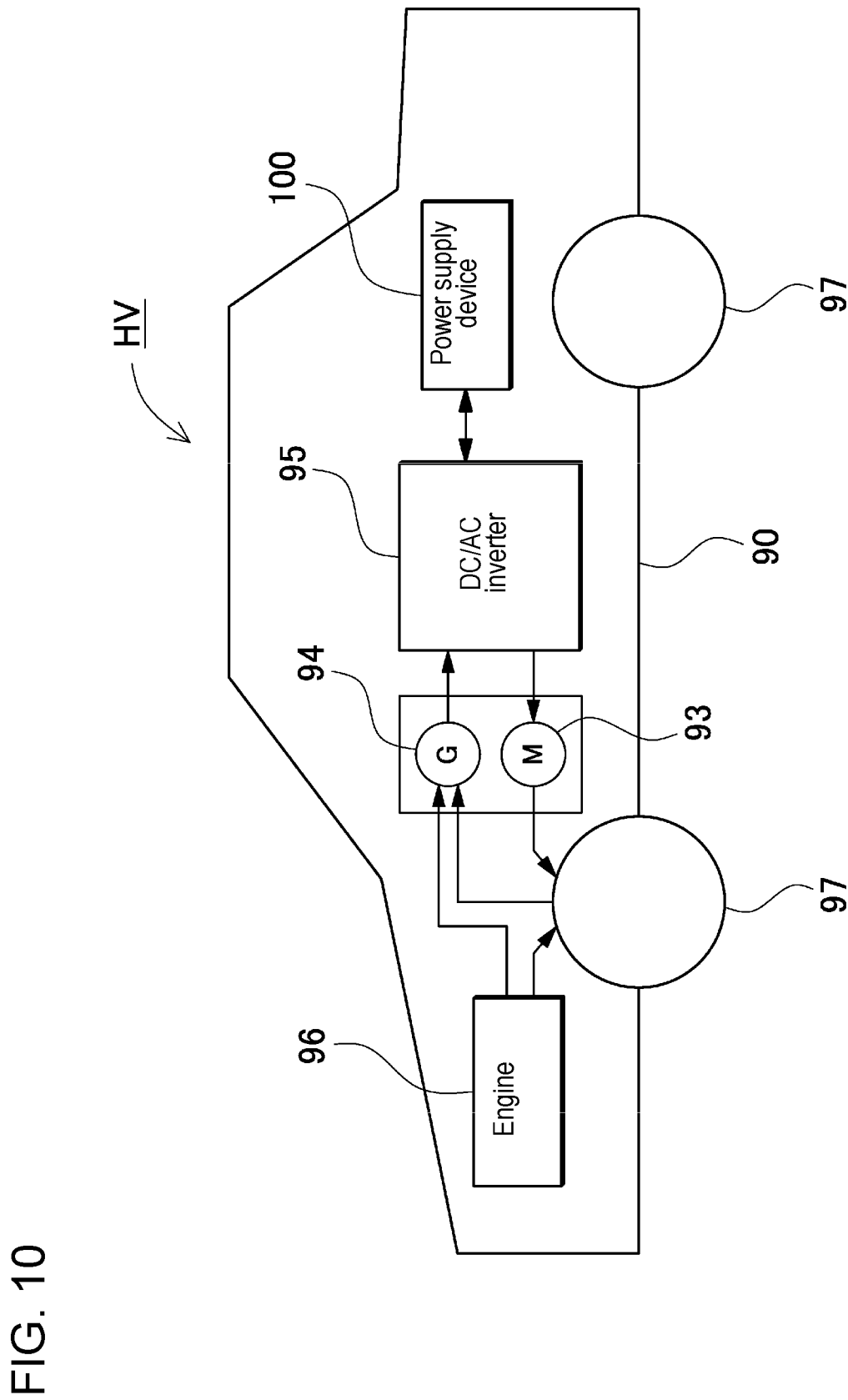
FIG. 10 is a block diagram illustrating an example in which the power supply device is mounted on a hybrid car that runs with an engine and a motor.

FIG. 10 illustrates an example in which the power supply device is mounted on a hybrid vehicle that runs with both the engine and the motor. Vehicle HV on which the power supply device is mounted, illustrated in this drawing, includes vehicle body 90, engine 96 and running motor 93 that run vehicle body 90, power supply device 100 that supplies electric power to motor 93, generator 94 that charges a battery of power supply device 100, and wheels 97 that are driven by motor 93 and engine 96 to run vehicle body 90. Power supply device 100 is connected to motor 93 and generator 94 via direct current (DC)/alternating current (AC) inverter 95. Vehicle HV runs with both motor 93 and engine 96 while charging and discharging the battery of power supply device 100. Motor 93 runs the vehicle by being driven in a region where engine efficiency is low, for example, during acceleration or low speed running. Motor 93 is driven by the electric power supplied from power supply device 100. Generator 94 is driven by engine 96 or regenerative braking when the vehicle is braked, to charge the battery of power supply device 100.

(Power Supply Device for Electric Automobile)

Figure 11:
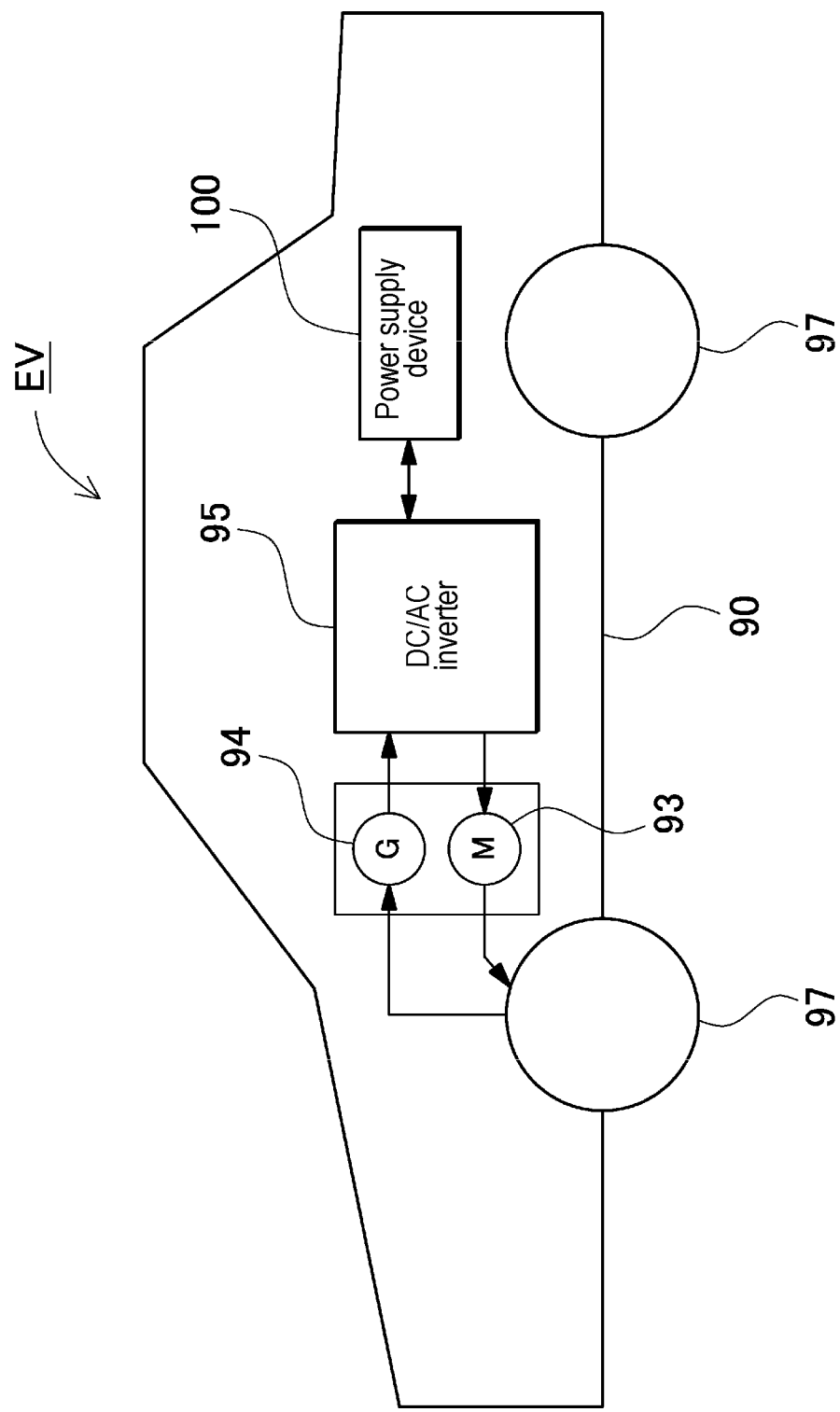
FIG. 11 is a block diagram illustrating an example in which the power supply device is mounted on an electric automobile that runs only with the motor.

Furthermore, FIG. 11 illustrates an example in which the power supply device is mounted on the electric automobile that runs only with the motor. Vehicle EV on which the power supply device is mounted, illustrated in this drawing, includes vehicle body 90, running motor 93 that runs vehicle body 90, power supply device 100 that supplies electric power to motor 93, generator 94 that charges a battery of power supply device 100, and wheels 97 that are driven by motor 93 to run vehicle body 90. Motor 93 is driven by the electric power supplied from power supply device 100. Generator 94 is driven by energy for regenerative braking of vehicle EV to charge the battery of power supply device 100.

(Power Supply Device for Power Storage)

Figure 12:
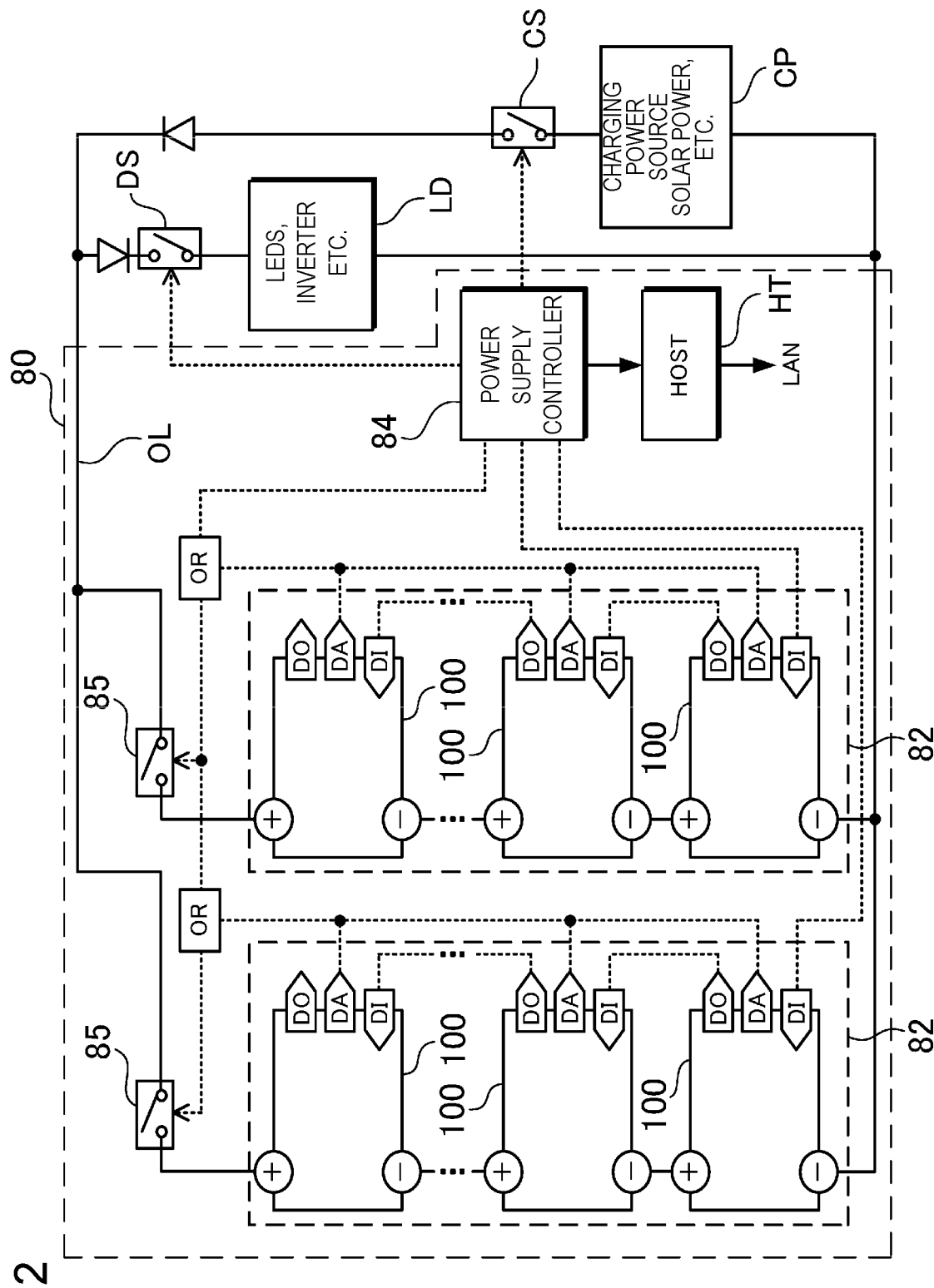
FIG. 12 is a block diagram illustrating an example of using the power supply device for a power storage device.

Furthermore, the present invention does not limit an application of the power supply device to the power supply device mounted on the electric vehicle. For example, the power supply device can be used as a power supply device for a power storage device that stores natural energy such as solar power generation and wind power generation, and can be used for all applications for storing large electric power, such as a power supply device for a power storage device that stores midnight electric power. For example, the power supply device can be used for a power supply system, as a power source in a house or a factory, that is charged with sunlight, midnight electric power, or the like and is discharged as needed, a power source for a street light that is charged with sunlight during a day and is discharged at night, a backup power source for a traffic light that is driven during a power failure, and the like. Such an example is illustrated in FIG. 12. Note that, in a usage example as the power storage device illustrated in FIG. 12, an example will be described in which large-capacity and high-output power storage device 80 is structured in which a large number of power supply devices described above are connected in series or in parallel, and a necessary controlling circuit is further added in order to obtain desired electric power.

In power storage device 80 illustrated in FIG. 12, a plurality of power supply devices 100 is connected in a unit to form power supply units 82. In each of power supply devices 100, a plurality of battery cells is connected in series and/or in parallel. Each of power supply devices 100 is controlled by power supply controller 84. Power storage device 80 drives load LD after charging power supply units 82 with charging power source CP. Therefore, power storage device 80 has a charging mode and a discharging mode. Load LD and charging power source CP are connected to power storage device 80 via discharging switch DS and charging switch CS, respectively. An on-state and an off-state of discharging switch DS and charging switch CS are switched by power supply controller 84 of power storage device 80. In the charging mode, power supply controller 84 turns on charging switch CS and turns off discharging switch DS to permit charging from charging power source CP to power storage device 80. In addition, when charging is completed and power storage device 80 is fully charged, or in a state where a capacity of a predetermined value or more is charged, power supply controller 84 turns off charging switch CS and turns on discharging switch DS in response to a request from load LD, to switch to the discharging mode so that discharging from power storage device 80 to load LD is permitted. Furthermore, if necessary, charging switch CS may be turned on and discharging switch DS may be turned on to supply electric power to load LD and charge power storage device 80 at the same time.

Load LD driven by power storage device 80 is connected to power storage device 80 via discharging switch DS. In the discharging mode of power storage device 80, power supply controller 84 switches on discharging switch DS to connect power storage device 80 to load LD and drives load LD with electric power from power storage device 80. As discharging switch DS, a switching element such as a field effect transistor (FET) can be used. The on-state and the off-state of discharging switch DS are controlled by power supply controller 84 of power storage device 80. Power supply controller 84 also includes a communication interface for communicating with external devices. In the example of FIG. 12, power supply controller 84 is connected to host device HT according to an existing communication protocol such as a universal asynchronous receiver/transmitter (UART) or a recommended standard (RS)-232C. Furthermore, if necessary, a user interface for a user to operate a power supply system can be provided.

Each of power supply devices 100 includes a signal terminal and a power supply terminal. The signal terminal includes input/output terminal DI, abnormality output terminal DA, and connection terminal DO. Input/output terminal DI is a terminal for inputting and outputting a signal from another power supply device 100 or power supply controller 84, and connection terminal DO is a terminal for inputting and outputting a signal to and from another power supply device 100. Furthermore, abnormality output terminal DA is a terminal for outputting an abnormality of power supply device 100 to an outside. In addition, power supply terminal is a terminal for connecting power supply devices 100 to each other in series and in parallel. Furthermore, power supply units 82 are connected to output line OL via parallel connection switches 85 and are connected to each other in parallel.

Example 1

Thermal insulation sheet 2 used in the above power supply device was produced in the following manner.

The papermaking slurry was made by suspending, dispersing glass fibers of 10% by weight and nylon fibers of 10% by weight in magnesium silicate (sepiolite) of 80% by weight. The papermaking slurry was subjected to the wet papermaking to be processed into a sheet shape, dried, and then hot-pressed to obtain inorganic fiber sheet 2X with a thickness of 0.7 mm and a weight of 5 g. Thermal insulation sheet 2 was produced by adhering polyethylene films of a thickness of 50 μm on both surfaces of the obtained inorganic fiber sheet 2X.

The above thermal insulation sheet 2 was cut in an outer size of stacking surface 11A of battery cell 1. The power supply device having battery block 10 in which thermal insulation sheet 2 was sandwiched between stacking surfaces 11A of adjacent battery cells 1, was made. A test was made as to whether or not a battery cell adjacent to a certain battery cell thermally ran away in a state where the certain battery cell was intentionally or forcibly caused to thermally run away. In battery block 10 with thermal insulation sheet 2 sandwiched between stacking surfaces 11A, a thermal runaway of an adjacent battery cell thermally running away, was prevented.

Here, as battery cell 1, the prismatic battery cell having the outer size of stacking surface 11A of 9.0 cm×15.0 cm and the thickness of 2.6 cm, was used.

Example 2

A thermal insulation sheet was produced by a method of Example 1 except that plastic sheets were not laminated on both surfaces. Thermal insulation sheet 2 was also able to prevent a thermal runaway of an adjacent battery cell thermally running away in a test method similar to Example 1.

Comparative Example

In a battery block using a thermal insulation sheet made of polyethylene with a thickness of 1 mm, in a state where a certain battery cell was caused to thermally run away, a battery cell adjacent to the certain battery cell thermally ran away.

INDUSTRIAL APPLICABILITY

A power supply device according to the present invention can be suitably used as a power supply device for a plug-in hybrid electric automobile and a hybrid electric automobile that can switch between an electric vehicle (EV) running mode and a hybrid electric vehicle (HEV) running mode, an electric automobile, and the like. Furthermore, the power supply device according to the present invention can be appropriately used for applications such as a backup power source that can be mounted on a computer server rack, a backup power source for a wireless base station for a cellular phone or the like, a power storage device combined with a solar cell, such as a power source for power storage in a house or a factory and a power source for a street light, and a backup power source for a traffic light or the like.

The invention claimed is:
1. A power supply device comprising:
   a plurality of battery cells each having a prismatic shape;
   a fixing member that fixes the plurality of battery cells in a stacked state; and
   a thermal insulation sheet that is sandwiched between stacking surfaces of the plurality of battery cells and thermally insulates adjacent ones of the plurality of battery cells,
   wherein the thermal insulation sheet is an inorganic fiber sheet where inorganic fibers are aggregated in a three-dimensionally non-directional manner and gaps are provided between the inorganic fibers, and
   wherein the inorganic fiber sheet includes a thermoplastic resin in the gaps between the inorganic fibers and wherein the gaps between the inorganic fibers are further filled with inorganic particles, the inorganic particles being capable of moving relative to the gaps.
2. The power supply device according to claim 1,
   wherein the thermal insulation sheet further comprises a protective sheet adhered to a surface of the inorganic fiber sheet, the protective sheet being configured so as to prevent the inorganic particles from leaking to an outside.

3. The power supply device according to claim 2, wherein the inorganic particles are inorganic hollow particles or inorganic foamed particles.

4. The power supply device according to claim 2, wherein the protective sheet is thermoplastic resin.

5. The power supply device according to claim 2, wherein the protective sheet is a plastic sheet, a woven fabric, or a non-woven fabric.

6. The power supply device according to claim 2, wherein the protective sheet is adhered to a stacking surface of one of the plurality of battery cells via a double-sided adhesive tape.

7. An electric vehicle comprising the power supply device according to claim 1, wherein the electric vehicle comprises: the power supply device; a running motor that is supplied with electric power from the power supply device; a vehicle body where the power supply device and the running motor are mounted; and wheels that are driven by the motor to run the vehicle body.

8. An electric vehicle comprising the power supply device according to claim 1, wherein the power storage device comprises: the power supply device; and a power supply controller that controls charging and discharging to the power supply device, and the power supply controller enables the battery cells to be charged with electric power from an outside and controls charging to the battery cells.

\* \* \* \* \*